US011958413B2

United States Patent
Lu et al.

(10) Patent No.: US 11,958,413 B2
(45) Date of Patent: Apr. 16, 2024

(54) FOREIGN OBJECT DETECTING SYSTEM AND METHOD

(71) Applicant: ANPEC ELECTRONICS CORPORATION, Hsinchu (TW)

(72) Inventors: Yi-Chuan Lu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 1021 days.

(21) Appl. No.: 16/843,631

(22) Filed: Apr. 8, 2020

(65) Prior Publication Data

US 2021/0213883 A1 Jul. 15, 2021

(30) Foreign Application Priority Data

Jan. 10, 2020 (TW) ................. 109100821

(51) Int. Cl.
*B60R 1/06* (2006.01)
*B60S 1/08* (2006.01)
*B60S 1/56* (2006.01)
*G01J 1/02* (2006.01)
*G01V 8/12* (2006.01)

(52) U.S. Cl.
CPC .......... *B60R 1/0602* (2013.01); *B60S 1/0848* (2013.01); *B60S 1/56* (2013.01); *G01J 1/0252* (2013.01); *G01V 8/12* (2013.01)

(58) Field of Classification Search
CPC .... B60R 1/0602; B60S 1/0848; G01J 1/0252; G02B 27/0006
See application file for complete search history.

(56) References Cited

U.S. PATENT DOCUMENTS 10,520,723 B2 * 12/2019 Cohen .................... B08B 13/00
11,493,440 B2 * 11/2022 Herrero ............. G01N 21/3563

FOREIGN PATENT DOCUMENTS

CN 109760587 A 5/2019
DE 19947023 A1 * 5/2001 ........... G01S 17/026

* cited by examiner

*Primary Examiner* — Hung Q Nguyen
*Assistant Examiner* — Mark L. Greene
(74) *Attorney, Agent, or Firm* — Li & Cai Intellectual Property (USA) Office

(57) ABSTRACT

A foreign object detecting system and a method are provided. A control circuit controls a light transmitter and a light receiver. The light transmitter is disposed adjacent to a detected object and emits a light signal toward the detected object. The light receiver is disposed adjacent to the detected object in a path along which the light signal reflected by the detected object travels. The light receiver receives the light signal reflected to the light receiver. In a pre-operation, the control circuit defines the light signal received by the light receiver when the foreign object is not on the detected object as a first reflected light signal. In a detection operation, the control circuit determines that a difference exists between the light signal currently received by the light receiver and the first reflected light signal, the control circuit determines that the foreign object is on the detected object.

10 Claims, 9 Drawing Sheets

FOREIGN OBJECT DETECTING SYSTEM AND METHOD

CROSS-REFERENCE TO RELATED PATENT APPLICATION

This application claims the benefit of priority to Taiwan Patent Application No. 109100821, filed on Jan. 10, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detection technology, and more particularly to a foreign object detecting system and a method.

BACKGROUND OF THE DISCLOSURE

Rearview mirrors are important safety devices and widely used in various automobiles. Foreign objects such as from rain and snow are easily attached to the rearview mirrors of the automobiles to affect vision and traffic safety of drivers. An image recognition technology is often used to detect the foreign objects on the rearview mirrors. However, an after-image may appear in an image of a mirror surface of the rearview mirror that is captured by a camera. As a result, the foreign objects cannot be recognized from the image and cannot be accordingly cleared away from the mirror surface of the rearview mirror, which may cause traffic accidents to occur.

SUMMARY OF THE DISCLOSURE

In response to the above-referenced technical inadequacies, the present disclosure provides a foreign object detecting system, which includes a light transmitter, a light receiver and a control circuit. The light transmitter is disposed adjacent to a detected object and configured to emit a light signal toward the detected object. The light receiver is disposed adjacent to the detected object in a path along which the light signal reflected by the detected object travels. The light receiver is configured to receive the light signal reflected to the light receiver. The control circuit is connected to the light transmitter and the light receiver, and configured to control the light transmitter and the light receiver. In a pre-operation, the control circuit obtains and defines the light signal received by the light receiver when a foreign object is not on the detected object as a first reflected light signal. In a detection operation, when the control circuit determines that a difference exists between the light signal received by the light receiver and the first reflected light signal, the control circuit determines that the foreign object is on the detected object.

In certain embodiments, the light receiver includes a first sub-light receiver and a second sub-light receiver, which are arranged along a diagonal direction of the light transmitter.

In certain embodiments, the light transmitter includes a first sub-light transmitter and a second sub-light transmitter, which are arranged along a diagonal direction of the light receiver.

In certain embodiments, the light receiver receives the light signal during a preset detection time.

In certain embodiments, when the control circuit determines that the foreign object is on the detected object, the control circuit controls a cleaning tool to clear away the foreign object.

In addition, the present disclosure provides a foreign object detecting method, which includes steps of: emitting a light signal toward a detected object by a light transmitter; receiving the light signal reflected to a light receiver by the light receiver; and determining, by a control circuit, whether or not a difference exists between the light signal currently received by the light receiver and the light signal received by the light receiver when a foreign object is not on the detected object, in response to determining that the difference does not exist, determining that the foreign object is not on the detected object, in response to determining that the difference exists, determining that the foreign object is on the detected object.

In certain embodiments, the foreign object detecting method includes a step of: arranging a first sub-light receiver and a second sub-light receiver along a diagonal direction of the light transmitter.

In certain embodiments, the foreign object detecting method includes a step of: arranging a first sub-light transmitter and a second sub-light transmitter along a diagonal direction of the light receiver.

In certain embodiments, the foreign object detecting method includes steps of: setting a preset detection time; and receiving the light signal by the light receiver during the preset detection time.

In certain embodiments, the foreign object detecting method includes steps of: controlling a cleaning tool to clear away the foreign object when determining that the foreign object is on the detected object, by the control circuit.

As described above, the present disclosure provides the foreign object detecting system and a method. One set of the light transmitter and the light receiver is disposed on the detected object such as the rearview mirror and applies a progressive sensing manner. The light transmitter emits the light signal toward the surface of the detected object. The light receiver detects the light signal reflected by the detected object. When the control circuit determines that the energy difference exists between the light signal currently received by the light receiver and the light signal previously received by the same, the control circuit determines that the foreign object is on the mirror surface and drives the cleaning tool to clear away the foreign object. Therefore, only small-size components and built-in electronic circuits are integrated into the foreign object detecting system. The foreign object can be accurately detected and timely cleared away from the detected object without using an additional hardware device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
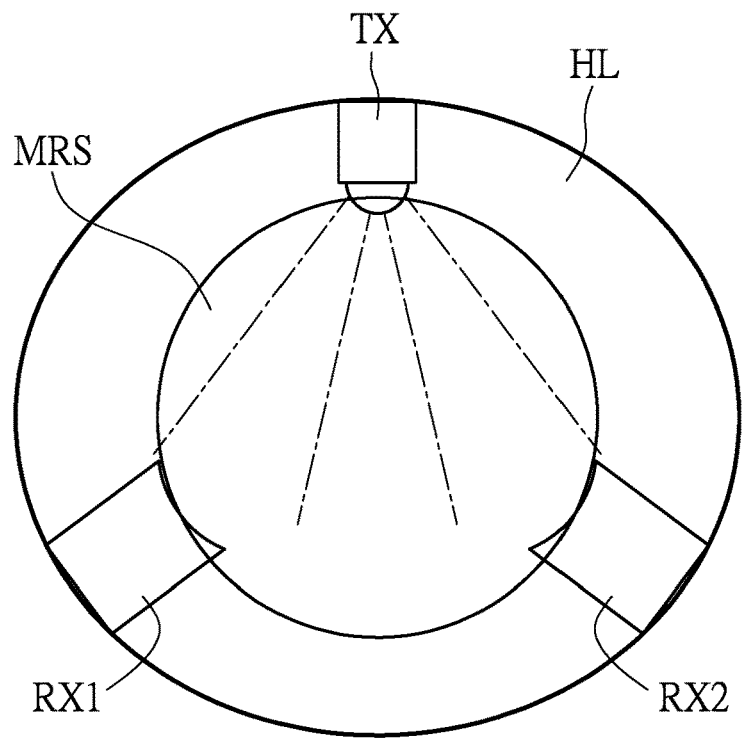
FIG. 1 is a component configuration diagram of one light transmitter and two sub-light receivers of a foreign object detecting system applied to a rearview mirror according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a component configuration diagram of one light transmitter and two sub-light receivers of a foreign object detecting system applied to a rearview mirror according to an embodiment of the present disclosure.

The foreign object detecting system of the embodiment of the present disclosure is applied to a mirror body MRS of a rearview mirror of an automobile. In practice, the foreign object detecting system may also be applied to a display device and a windscreen of the automobile, an outdoor monitor, camera lenses, and other detected objects on which foreign objects can be optically detected.

As shown in FIG. 1, in the embodiment, the foreign object detecting system includes a light transmitter TX, which is disposed adjacent to a mirror surface of the mirror body MRS along an outer edge of the mirror surface of the mirror body MRS of the rearview mirror of the automobile. For example, the light transmitter TX is disposed on a mirror bracket HL for supporting the mirror body MRS, but the present disclosure is not limited thereto. The light transmitter TX is configured to synchronously or sequentially emit a plurality of light signals toward the mirror surface of the mirror body MRS, or emit only one light signal in practice. The type of the light transmitter TX, and an angle, a direction, a range, a frequency and an intensity of the light signal emitted by the light transmitter TX may be appropriately adjusted according to actual requirements.

In the embodiment, the foreign object detecting system may further include a light receiver. The light receiver includes a first sub-light receiver RX1 and a second sub-light receiver RX2, both of which may be the same type or different types of light receivers. The first sub-light receiver RX1 and the second sub-light receiver RX2 are disposed in a path. After the light transmitter TX emits the light signal, the light signal is reflected by the mirror body MRS of the detected object to travel along the path. The first sub-light receiver RX1 detects and receives the light signal reflected to the first sub-light receiver RX1 by the mirror surface of the mirror body MRS of the detected object. Similarly, the second sub-light receiver RX2 detects and receives the light signal reflected to the second sub-light receiver RX2 by the mirror surface of the mirror body MRS of the detected object.

As described above, one light transmitter TX and two light receivers that are the first sub-light receiver RX1 and the second sub-light receiver RX2 are exemplified in the embodiment. The first sub-light receiver RX1 and the second sub-light receiver RX2 are arranged along a diagonal direction of the light transmitter TX. That is, the first sub-light receiver RX, the second sub-light receiver RX2 and the light transmitter TX are disposed in a three point collinear arrangement on the same mirror surface of the mirror body MRS, but the present disclosure is not limited thereto. It should be understood that, in practice, the number and the positions of light transmitters and light receivers may be appropriately adjusted according to a surface shape and a reflection coefficient of the detected object, or other parameters or factors.

Figure 2:
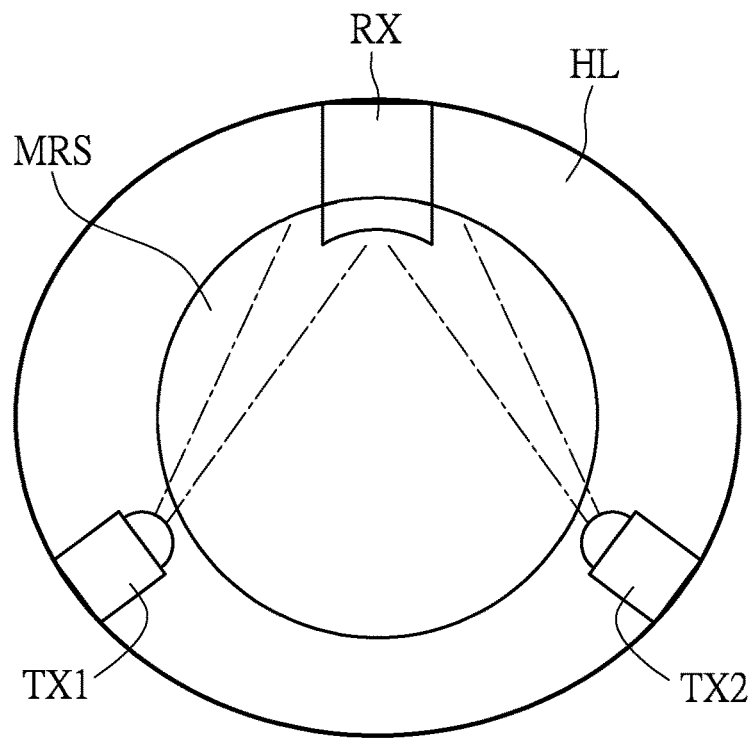
FIG. 2 is a component configuration diagram of a light receiver and two sub-light transmitters of a foreign object detecting system applied to a rearview mirror according to an embodiment of the present disclosure.

Reference is made to FIG. 2, which is a component configuration diagram of a light receiver and two sub-light transmitters of a foreign object detecting system applied to a rearview mirror according to an embodiment of the present disclosure.

The same descriptions of the embodiments shown in FIGS. 1 and 2 are not repeated herein. The number and the positions of the light receivers and the light transmitters are different in the embodiments shown in FIGS. 1 and 2. In detail, as shown in FIG. 2, in the embodiment, the foreign object detecting system includes one light receiver RX and two light transmitters that are a first sub-light transmitter TX1 and a second sub-light transmitter TX2. The light receiver RX, the first sub-light transmitter TX1 and the second sub-light transmitter TX2 are disposed opposite to each other along an edge of a surface of the detected object such as the mirror surface of the mirror body MRS.

For example, the first sub-light transmitter TX1 and the second sub-light transmitter TX2 may be arranged along a diagonal direction of the light receiver RX. The first sub-light transmitter TX1, the second sub-light transmitter TX2 and the light receiver RX are disposed in a three point collinear arrangement on the same mirror surface of the mirror body MRS, but the present disclosure is not limited thereto.

The light receiver RX is disposed in a path along which the light signal reflected by the mirror surface of the mirror body MRS of the detected object travels. After any one or both of the first sub-light transmitter TX1 and the second sub-light transmitter TX2 emit the light signal toward the mirror surface of the mirror body MRS, the light receiver RX receives the light signal reflected by the mirror surface of the mirror body MRS.

Figure 3:
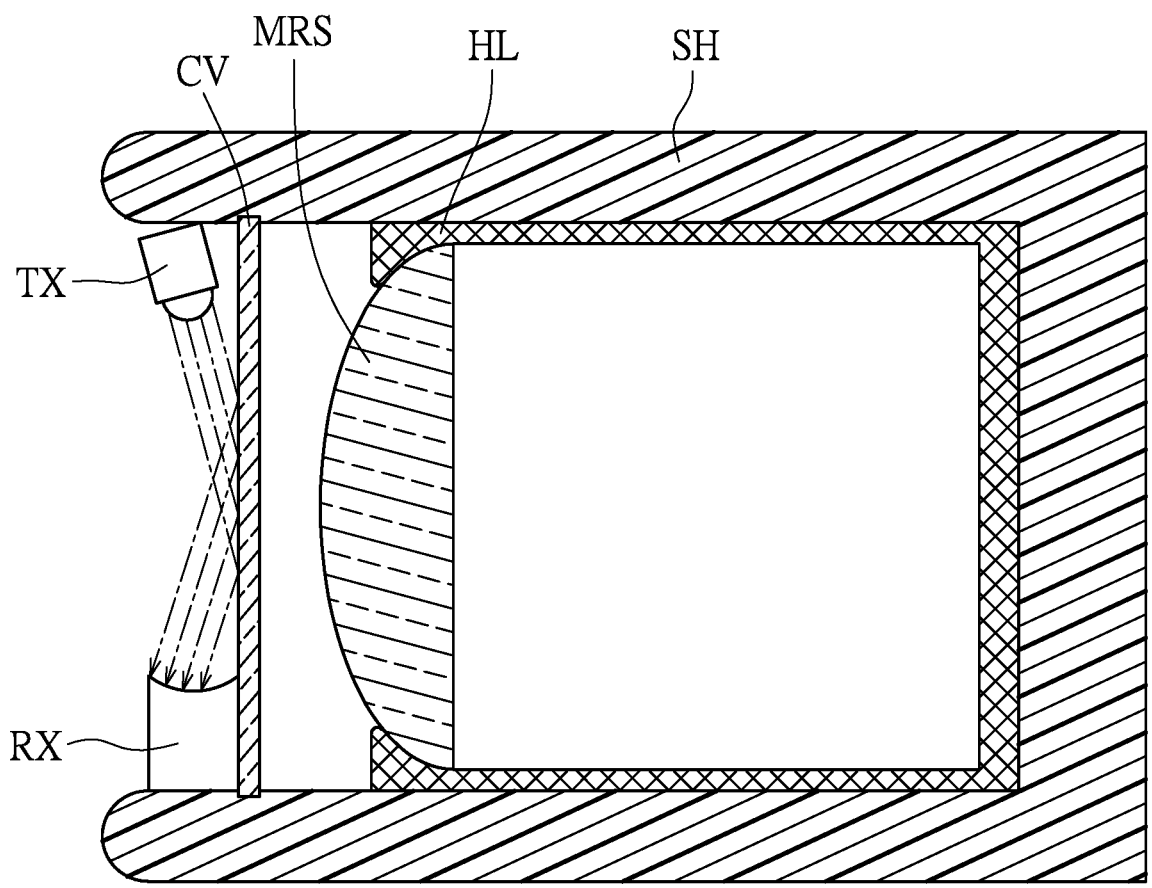
FIG. 3 is a schematic diagram of a detected object on which a foreign object is not detected by a foreign object detecting system according to an embodiment of the present disclosure.
Figure 4:
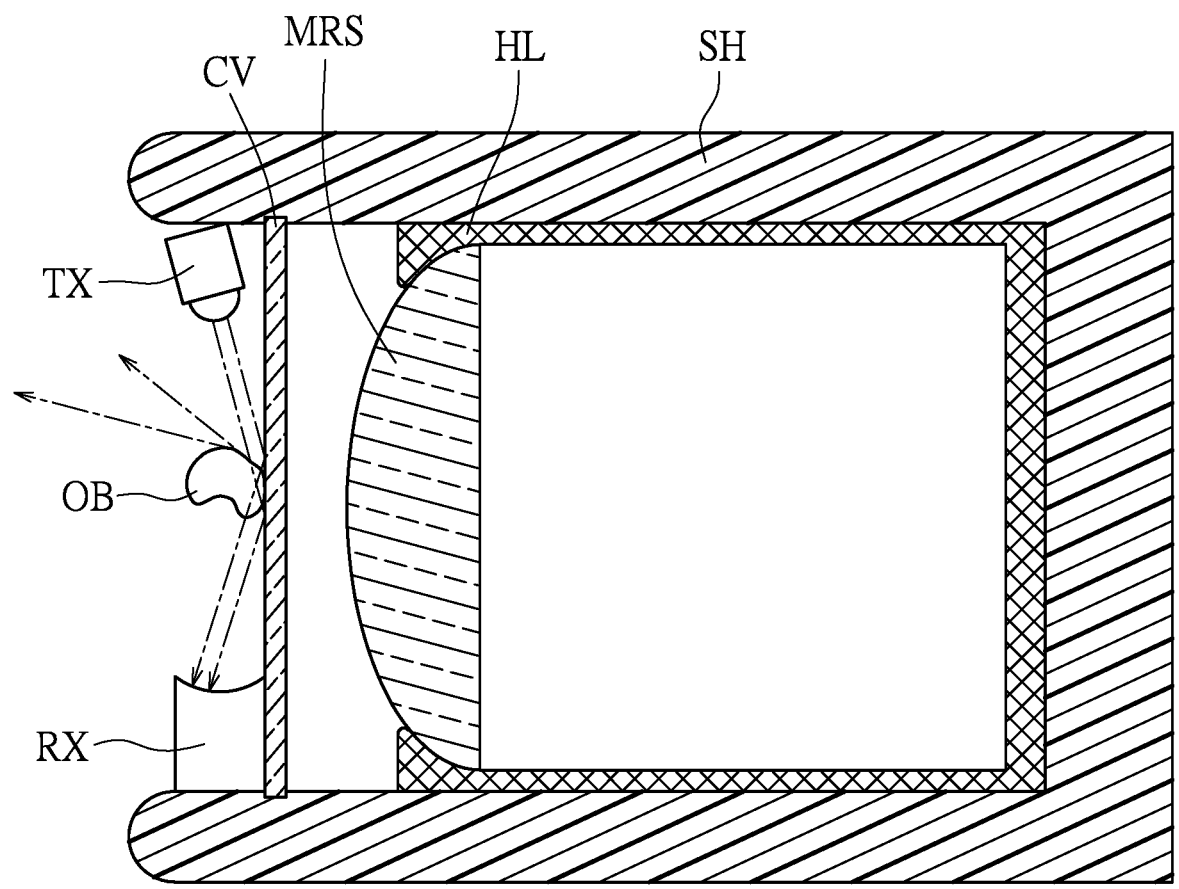
FIG. 4 is a schematic diagram of the detected object on which the foreign object is detected by the foreign object detecting system according to the embodiment of the present disclosure.

Reference is made to FIGS. 3 and 4, wherein FIG. 3 is a schematic diagram of a detected object on which a foreign object is not detected by a foreign object detecting system according to an embodiment of the present disclosure, and FIG. 4 is a schematic diagram of a detected object on which a foreign object is detected by the foreign object detecting system according to an embodiment of the present disclosure.

In the embodiment, the foreign object detecting system includes the light transmitter TX, the light receiver RX and a control circuit, which are applied to detect the foreign object on a surface of a cover CV of a lens of the rearview mirror. In practice, the foreign object detecting system may also be applied to the detected object exemplified in the other embodiments of the present disclosure.

As shown in FIG. 3, the mirror body MRS is held and supported by the mirror bracket HL of the rearview mirror in a shell SH of the rearview mirror. The cover CV is disposed inside the shell SH of the rearview mirror. The cover CV is disposed adjacent to a side of the mirror body MRS that faces an external environment and covers the shell SH to separate the mirror body MRS from the external environment, thereby preventing the foreign object in the external environment from attaching to the mirror surface of the mirror body MRS.

However, the foreign object of the external environment may be attached to a surface of the cover CV that is a detected object. Therefore, the light transmitter TX and the light receiver RX are disposed adjacent to the cover CV in the shell SH of the rearview mirror. The light transmitter TX faces the mirror body MRS. The light receiver RX is disposed in a path. After the light transmitter TX emits the light signal, the light signal is reflected by the cover CV to travel along the path. The number and the position of the light transmitter TX and the light receiver RX may be adjusted according to actual requirements.

In a pre-operation, after the light transmitter TX emits the light signal (which may be a single or multiple beams) toward the surface of the cover CV, the light receiver RX receives the light signal reflected by the surface of the cover CV. The control circuit obtains and defines the light signal received by the light receiver when the foreign object is not on the detected object as a first reflected light signal. A detection operation is performed in an actual application, as described below.

In the detection operation, as shown in FIG. 3, the foreign object is not on the cover CV. Under this condition, after the light transmitter TX emits the light signal that is the same as that in the pre-operation toward the surface of the cover CV, the light signal is reflected by the surface of the cover CV to form the first reflected light signal incident to the light receiver RX. The light receiver RX detects and receives the first reflected light signal.

It is worth noting that, as shown in FIG. 4, a foreign object OB is on the cover CV. Under this condition, after the light transmitter TX emits the light signal that is the same as that in the pre-operation toward the cover CV, one part of the light signal is reflected or refracted to diverge away from the light receiver RX by the foreign object OB. The other parts of the light signal are reflected by the surface of the cover CV to form a second reflected light signal incident to the light receiver RX. Therefore, when the foreign object OB is on the surface of the cover CV, energy of the second reflected light signal received by the light transmitter TX is lower than that of the first reflected light signal.

That is, when the control circuit determines that the energy (such as a light intensity) of the light signal received by the light receiver RX is the same as that of the first reflected light signal, the control circuit determines that the foreign object OB is not on the cover CV. However, when the energy of the light signal received by the light receiver RX is different from that of the first reflected light signal, for example, the light signal is the second reflected light signal having the energy lower than that of the first reflected light signal, the control circuit determines that the foreign object OB is on the cover CV.

Figure 5:
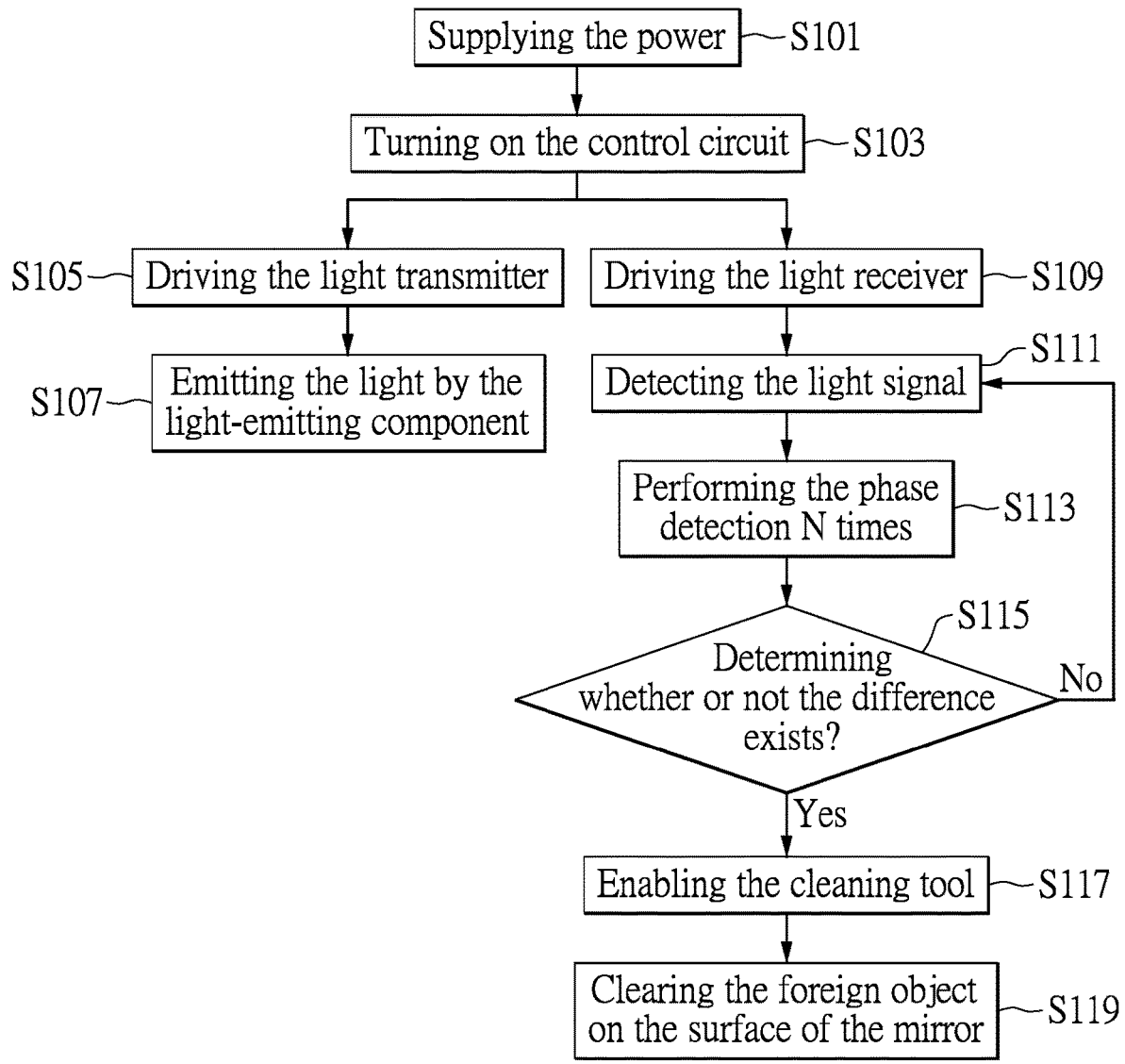
FIG. 5 is a flowchart diagram of a foreign object detecting method according to an embodiment of the present disclosure.
Figure 6:
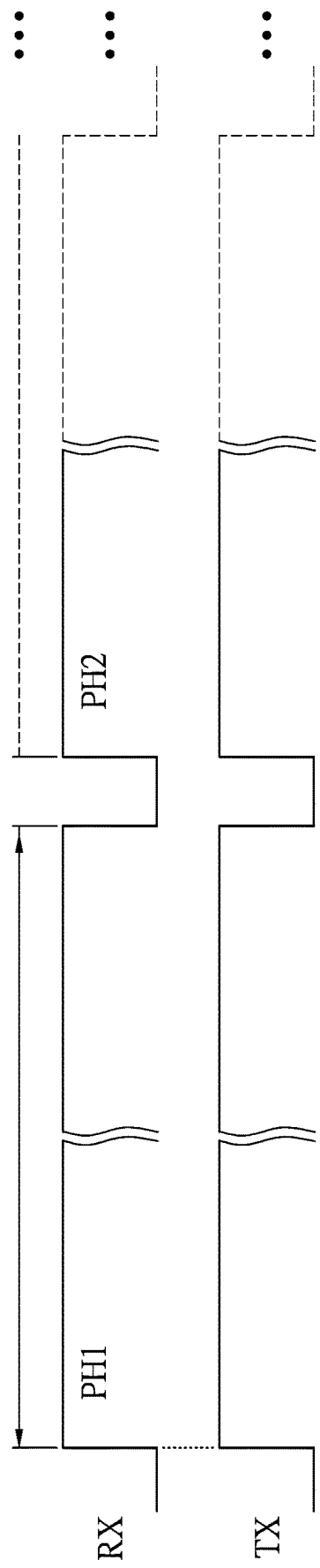
FIG. 6 is a waveform diagram of signals each having two phases in the foreign object detecting system according to the embodiments of the present disclosure.
Figure 7:
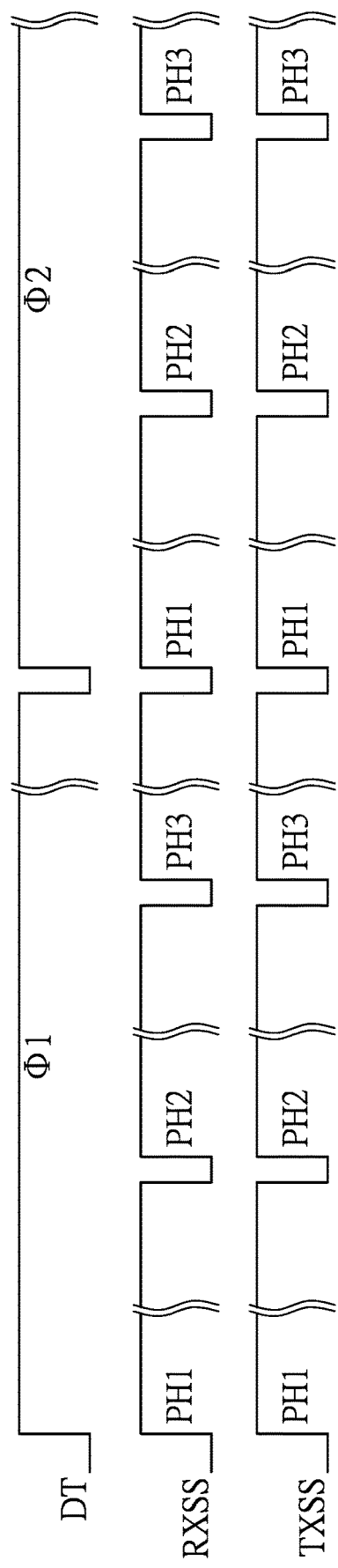
FIG. 7 is a waveform diagram of signals each having fourth phases in the foreign object detecting system according to the embodiments of the present disclosure.

Reference is made to FIGS. 5 to 7, wherein FIG. 5 is a flowchart diagram of a foreign object detecting method according to an embodiment of the present disclosure, FIG. 6 is a waveform diagram of signals each having two phases in the foreign object detecting system according to the embodiments of the present disclosure, and FIG. 7 is a waveform diagram of signals each having fourth phases in the foreign object detecting system according to the embodiments of the present disclosure. In the embodiment, the foreign object detecting method includes steps S101 to S119 shown in FIG. 5, which may be performed by the foreign object detecting system in the embodiments of the present disclosure, as described specifically below.

In step S101, external power is provided.

In step S103, when the external power is supplied to the control circuit, the control circuit is activated.

In step S105, the control circuit drives the light transmitter to emit the light signal toward the surface of the detected object such as the display device and the windscreen of the automobile, the outdoor monitor or the camera lenses.

In step S107, a light-emitting component such as a light-emitting diode emits light such as red light according to an operational state of the light transmitter, but the present disclosure is not limited thereto.

In step S109, the control circuit drives the light receiver.

In step S111, the light receiver starts to determine whether or not the light signal is reflected to the light receiver.

In step S113, the light receiver may detect the light signal during a present detection time. For example, the light receiver performs phase detection N times, wherein N is any suitable value.

For example, the light transmitter operates during a working period of a light transmitter operating signal TXS shown in FIG. 6 and the light receiver operates during a working period of a light receiver operating signal RXS shown in FIG. 6. The light transmitter emits the light signal toward the detected object within the working period of the light transmitter operating signal TXS. For example, the light receiver performs the phase detection twice (N=2) within the working period of a light receiver operating signal RXS, but the present disclosure is not limited thereto. That is, the light receiver detects the light signal within a first phase PH1 and a second phase PH2. The present disclosure is not limited to an integration time of the light signal.

For example, as shown in FIG. 7, the light receiver performs the phase detection three times (N=3) within a first phase time $\Phi 1$ and a second phase time $\Phi 2$. That is, the light receiver detects the light signal within a first phase PH1, a second phase PH2 and a third phase PH3. The present disclosure is not limited to a time during which the light receiver detects the light signal reflected to the light receiver.

In step S115, the control circuit determines whether or not a difference exists between parameters of the light signal currently received by the light receiver and parameters of the light signal received when the foreign object is not on the detected object. For example, the parameters may include a light intensity and the integration time of the light signal. In addition, a photoelectric component converts light energy of the light signal received by the light receiver into a photocurrent, which may be included in the parameters. A voltage generated by the photocurrent may be included in the parameters. For example, the photocurrent charges a capacitor to have the voltage.

If the difference does not exist, the light signal received by the light receiver is the same as the above-mentioned first reflected light signal. Under this condition, the control circuit determines that the foreign object is not on the detected object. Therefore, steps S117 and S119 do not need to be performed. If necessary, the detection operation in step S111 may be performed again.

However, if the difference exists, the control circuit determines that the foreign object such as dust, grit or dirt is on the surface of the detected object. This means that the light signal is reflected, refracted or blocked by the foreign object such that the path along which the light signal travels is affected or the energy of the light signal is absorbed such that the energy of the light signal incident on the light receiver is weakened. That is, the light signal received by the light receiver is the same as the above-mentioned second reflected light signal. Under this condition, steps S117 and S119 are performed sequentially.

In step S117, the control circuit enables a cleaning tool.

In step S119, the control circuit controls the cleaning tool to move to a position where the foreign object exists to clear the foreign object away from the surface of the detected object. For example, the cleaning tool is a wiper, which is used to clear away the foreign object from the windscreen, but the present disclosure is not limited thereto.

More precisely, the control circuit determines whether or not the cleaning tool needs to be used to perform a cleaning operation based on the difference described in step S115, that is, the light energy lost from the light signal affected by the foreign object. For example, when the control circuit determines that the difference is larger than a difference threshold, steps 117 and 119 are performed.

Alternatively, the control circuit may determine a condition of the foreign object on the detected object such as a position and a size of the foreign object, based on the difference described in step S115, the reflection coefficient of the detected object, an emission angle of the light signal, and an incident angle of the light signal into the light receiver. The control circuit may determine whether or not the cleaning tool needs to be used to perform the cleaning operation and determine where the cleaning tool is moved to, based on the condition of the foreign object on the detected object.

After step S119 is performed, step S111 may also be performed again to determine a cleanliness of the surface of the mirror. For example, an operation of detecting whether or not the foreign object is on the detected object may be performed within the first phase time $\Phi 1$ of a detection period DT shown in FIG. 7. The present disclosure is not limited to the number of phases such as the first phase PH1 and the second phase PH2, within which the operation is performed. The operation may also be performed within the second phase time $\Phi 2$ of the detection period DT. An external interference may result in misdetection. Therefore, the operation may also be performed multiple times within the first phase time $\Phi 1$ and the second phase time $\Phi 2$, so as to determine whether the foreign object on the detected object has been removed to prevent the misdetection, but the present disclosure is not limited thereto.

Figure 8:
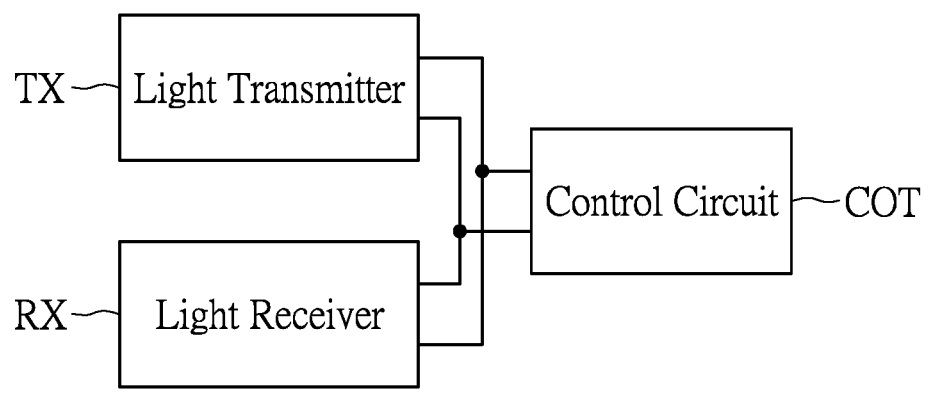
FIG. 8 is a component configuration diagram of the light transmitter, the light receiver and a control circuit of the foreign object detecting system according to the embodiment of the present disclosure.

Reference is made to FIG. 8, which is a component configuration diagram of the light transmitter, the light receiver and a control circuit of the foreign object detecting system according to the embodiment of the present disclosure.

As shown in FIG. 8, in the embodiment, the foreign object detecting system includes the light transmitter TX, the light receiver RX and a control circuit COT, which are applicable to determine whether or not the foreign object is on the detected object. The control circuit COT is connected to the light transmitter TX and the light receiver RX. The control circuit COT is configured to control the light transmitter TX to emit the light signal toward the detected object, and control the light receiver RX to detect and receive the light signal reflected to the light receiver RX.

In the pre-operation, the foreign object is not on the detected object. The control circuit COT defines the light signal received by the light receiver when the foreign object is not on the detected object as the first reflected light signal. In the subsequent detection operation, when the control circuit COT determines that the difference does not exist between the light signal currently received by the light receiver RX and the first reflected light signal, the control circuit COT determines that the foreign object is not on the surface of the detected object. Conversely, when the control circuit COT determines that the difference exists between the light signal currently received by the light receiver RX and the first reflected light signal, the control circuit COT determines that the foreign object is on the surface of the detected object.

Figure 9:
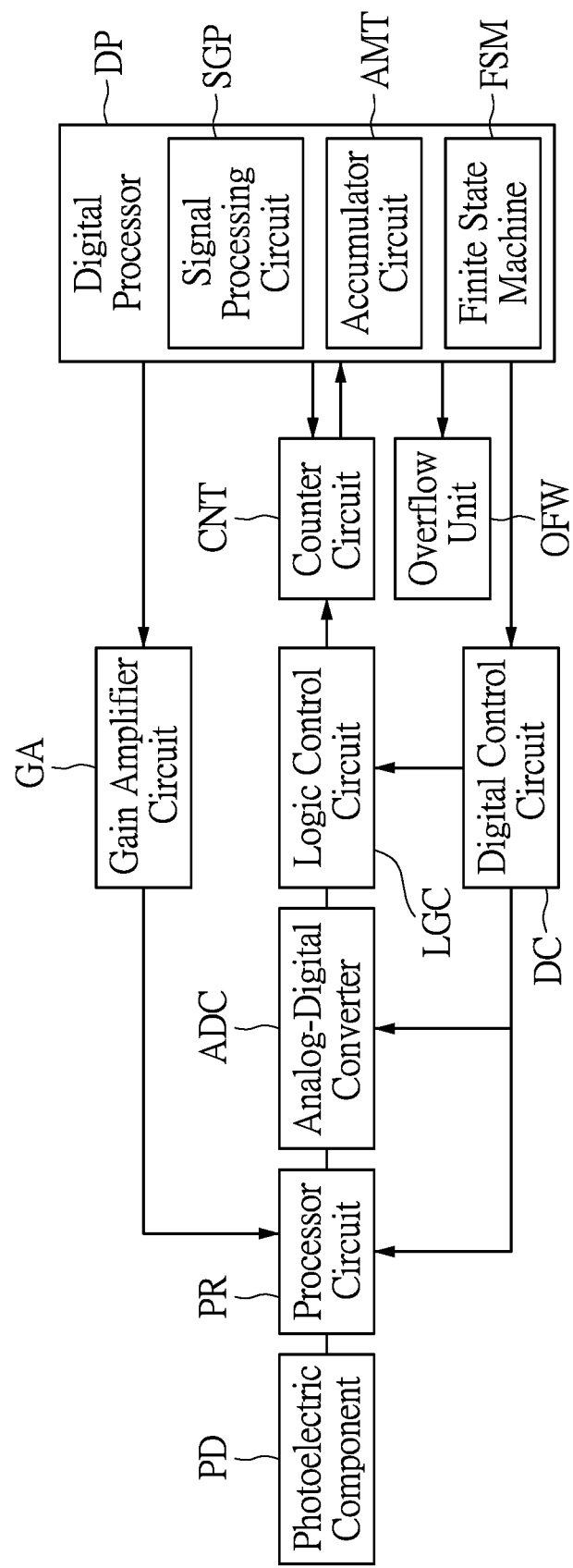
FIG. 9 is a circuit diagram of a light receiver of a foreign object detecting system according to an embodiment of the present disclosure.

Reference is made to FIG. 9, which is a circuit diagram of a light receiver of a foreign object detecting system according to an embodiment of the present disclosure. The foreign object detecting system in the embodiment of the present disclosure includes the light transmitter, the light receiver and the control circuit. The light receiver such as the light receiver RX shown in FIGS. 2 to 4 or other light receivers shown in other figures may include a photoelectric component PD, a processor circuit PR, an analog-digital converter ADC, a logic control circuit LGC, a counter circuit CNT, a digital processor DP, an overflow unit OFW, a digital control circuit DC, and a gain amplifier circuit GA as shown in FIG. 9.

The processor circuit PR is connected to the photoelectric component PD, the analog-digital converter ADC, the digital control circuit DC and the gain amplifier circuit GA. The logic control circuit LGC is connected to the analog-digital converter ADC, the digital control circuit DC and the counter circuit CNT. The digital processor DP is connected to the gain amplifier circuit GA, the counter circuit CNT, the overflow unit OFW and the digital control circuit DC. The digital control circuit DC is connected to the analog-digital converter ADC and the logic control circuit LGC.

First, the light transmitter emits the light signal toward the surface of the detected object. All or part of the light signal is reflected to the photoelectric component PD by the detected object. Then, the photoelectric component PD converts the light energy of the reflected light signal into the photocurrent to be provided to the processor circuit PR. The processor circuit PR converts the photocurrent into a voltage. For example, the processor circuit PR may include a capacitor. The photocurrent generated by the photoelectric component PD charges the capacitor to have the voltage.

If necessary, the processor circuit PR may output an analog voltage signal having the voltage converted by the processor circuit PR to the analog-digital converter ADC. The analog-digital converter ADC may convert the analog voltage signal into a digital voltage signal. The logic control circuit LGC may be a D-type flip-flop, a SR flip-flop or other types of logic circuits. The logic control circuit LGC may be triggered to output a logic signal at a logic level 0 or 1 to the counter circuit CNT according to the digital voltage signal.

The counter circuit CNT may count the number of pulse waves of the logic signal each time the logic signal reaches a high level. The stronger the light energy of the light signal received by the photoelectric component PD of the light receiver is, the more the pulse waves counted by the counter circuit CNT are, within a predetermined detection time.

The digital processor DP includes a signal processing circuit SGP, an accumulator circuit AMT and a finite state machine FSM. The signal processing circuit SGP is used as a backend processor. When the signal processing circuit SGP determines that the logic signal distorts or the energy of the photocurrent decreases during the conversion operation such that the number of pulse waves counted by the counter circuit CNT is incorrect, the signal processing circuit SGP corrects the logic signal. The signal processing circuit SGP may output a high logic level 1 and a low logic level 0 of the logic signal to the finite state machine FSM. The finite state machine FSM determines whether or not the counter circuit CNT correctly determines the logic level.

The counter circuit CNT may re-count the number of pulse waves according to the corrected logic signal. The accumulator circuit AMT accumulates the number of pulse waves each time the counter circuit CNT counts one pulse wave. When the number of the logic levels 1 and 0 of the logic signal is more than the number of the logic levels allowed to be inputted to the finite state machine FSM each time, the overflow logic level 1 or 0 may be temporarily stored in the overflow unit OFW.

The digital processor DP may control the digital control circuit DC and the gain amplifier circuit GA according to a correctness of the logic signal. For example, the digital processor DP may control the gain amplifier circuit GA to multiply the voltage of the analog voltage signal converted by the processor circuit PR by a gain to compensate distortion of the voltage. As a result, the digital processor DP obtains the correct number of pulse waves from the counter circuit CNT. Finally, the control circuit such as the control circuit COT shown in FIG. 8 determines whether or not the difference exists between the light signal currently received by the light receiver and the above-mentioned first reflected light signal, and accordingly determines whether or not the foreign object is on the detected object.

Figure 10:
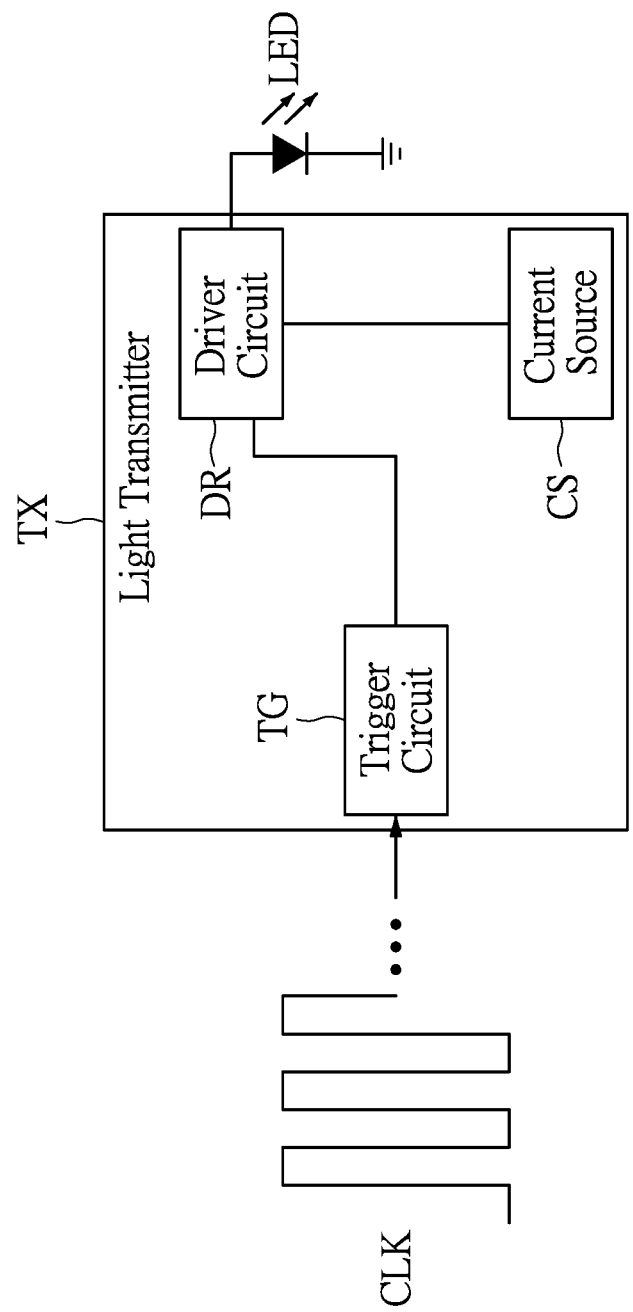
FIG. 10 is a circuit diagram of a control circuit of a foreign object detecting system according to an embodiment of the present disclosure.

Reference is made to FIG. 10, which is a circuit diagram of a control circuit of a foreign object detecting system according to an embodiment of the present disclosure. In the embodiment, the foreign object detecting system includes the light transmitter, the light receiver and the control circuit.

The light transmitter (such as the light transmitter TX shown in FIGS. 1, 3 and 4 or the other light transmitters shown in other figures) may include a trigger circuit TG, a driver circuit DR and a current source CS shown in FIG. 10. The trigger circuit TG is connected to the driver circuit DR and the current source CS. The current source CS is connected to the driver circuit DR.

The trigger circuit TG is configured to receive a clock signal CLK. When the clock signal CLK reaches a reference level such as a high level, the trigger circuit TG triggers the driver circuit DRS to drive a light-emitting component such as the light-emitting diode LED to emit light. After the driver circuit DR is triggered, the current source CS may provide a current to the driver circuit DR or other circuit components such as the light receiver.

In summary, the present disclosure provides the foreign object detecting system and a method. One set of the light transmitter and the light receiver is disposed on the detected object such as the rearview mirror and applies a progressive sensing manner. The light transmitter emits the light signal toward the surface of the detected object. The light receiver detects the light signal reflected by the detected object. When the control circuit determines that the energy difference exists between the light signal currently received by the light receiver and the light signal previously received by the same, the control circuit determines that the foreign object is on the mirror surface and drives the cleaning tool to clear away the foreign object. Therefore, only small-size components and built-in electronic circuits are integrated into the foreign object detecting system. The foreign object can be accurately detected and timely cleared away from the detected object without using an additional hardware device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A foreign object detecting system, comprising:
 a light transmitter disposed adjacent to a detected object and configured to emit a light signal toward the detected object;
 a light receiver disposed adjacent to the detected object in a path along which the light signal reflected by the detected object travels, wherein the light receiver includes a photoelectric component, a processor circuit, an analog-digital converter, a logic control circuit, a counter circuit, a digital processor, an overflow unit, a digital control circuit and a gain amplifier circuit, the processor circuit is connected to the photoelectric component and the analog-digital converter, the logic control circuit is connected to the analog-digital converter and the counter circuit, the digital processor is connected to the counter circuit and the overflow unit, the digital control circuit is connected to the processor circuit, the analog-digital converter, the logic control circuit and the digital processor, and the gain amplifier circuit is connected to the processor circuit and the digital processor; and a control circuit connected to the light transmitter and the light receiver, and configured to control the light transmitter and the light receiver in a pre-operation and a detection operation;

wherein in the pre-operation, the control circuit obtains and defines the light signal received by the light receiver when a foreign object is not on the detected object as a first reflected light signal;

wherein in the detection operation, the photoelectric component converts light energy of the light signal reflected to the photoelectric component into a photocurrent and provides the photocurrent to the processor circuit, the processor circuit converts the photocurrent into a voltage, the processor circuit outputs an analog voltage signal having the voltage that is converted from the photocurrent to the analog-digital converter, the analog-digital converter converts the analog voltage signal into a digital voltage signal and outputs the digital voltage signal to the logic control circuit, the logic control circuit outputs a logic signal to the counter circuit according to the digital voltage signal from the analog-digital converter, and the counter circuit counts a number of pulse waves of the logic signal each time when the logic signal reaches a high level;

wherein the digital processor includes a signal processing circuit and a finite state machine;

wherein, in the detection operation, the digital processor controls the gain amplifier circuit according to a correctness of the logic signal;

wherein, in the detection operation, when the signal processing circuit of the digital processor determines that the logic signal distorts such that the number of pulse waves counted by the counter circuit is incorrect, the digital processor controls the gain amplifier circuit to multiply the voltage of the analog voltage signal by a gain to compensate the voltage of the analog voltage signal, the processor circuit transmits the analog voltage signal that is compensated from the gain amplifier circuit to the analog-digital converter, the analog-digital converter converts the analog voltage signal that is compensated into the digital voltage signal that is compensated, the logic control circuit outputs the logic signal that is compensated to the counter circuit according to the digital voltage signal that is compensated, and the counter circuit counts a correct number of pulse waves according to the logic signal that is compensated;

wherein, in the detection operation, when the signal processing circuit of the digital processor determines that energy of the photocurrent decreases during an operation of converting the photocurrent into the voltage such that the number of pulse waves counted by the counter circuit is incorrect, the signal processing circuit of the digital processor corrects the logic signal and outputs the logic signal that is corrected to the counter circuit for counting the correct number of pulse waves;

wherein, in the detection operation, the signal processing circuit of the digital processor outputs logic levels of the logic signal to the finite state machine connected to the signal processing circuit, and the finite state machine determines whether the logic levels of the logic signal are correctly determined by the counter circuit;

wherein, in the detection operation, when a number of the logic levels of the logic signal is more than a number of the logic levels allowed to be inputted to the finite state machine each time, the logic levels that overflow are temporarily stored in the overflow unit;

wherein, in the detection operation, the control circuit, according to the correct number of pulse waves, determines whether a difference exists between the light signal currently received by the light receiver and the first reflected light signal to determine whether the foreign object is on the detected object.

2. The foreign object detecting system according to claim 1, wherein the light receiver includes a first sub-light receiver and a second sub-light receiver, which are arranged along a diagonal direction of the light transmitter.

3. The foreign object detecting system according to claim 1, wherein the light transmitter includes a first sub-light transmitter and a second sub-light transmitter, which are arranged along a diagonal direction included in the light receiver.

4. The foreign object detecting system according to claim 1, wherein the light receiver receives the light signal during a preset detection time.

5. The foreign object detecting system according to claim 1, wherein when the control circuit determines that the foreign object is on the detected object, the control circuit controls a cleaning tool to clear away the foreign object.

6. A foreign object detecting method, comprising processes of:

(a) emitting a light signal toward a detected object by a light transmitter;

(b) converting, by a photoelectric component included in a light receiver, light energy of the light signal reflected to the photoelectric component into a photocurrent;

(c) defining the light signal that is received by the photoelectric component of the light receiver when a foreign object is not on the detected object as a first reflected light signal, by a control circuit;

(d) converting the photocurrent into a voltage by a processor circuit included in the light receiver;

(e) outputting, by the processor circuit of the light receiver, an analog voltage signal having the voltage that is converted from the photocurrent to an analog-digital converter included in the light receiver;

(f) converting the analog voltage signal into a digital voltage signal, by the analog-digital converter of the light receiver;

(g) outputting, by a logic control circuit included in the light receiver, a logic signal to a counter circuit included in the light receiver according to the digital voltage signal from the analog-digital converter;

(h) counting, by the counter circuit of the light receiver, a number of pulse waves of the logic signal each time when the logic signal reaches a high level;

(i) controlling a gain amplifier circuit that is included in the light receiver according to a correctness of the logic signal, by a digital processor of the light receiver;

(j) determining, by a signal processing circuit of the digital processor of the light receiver, whether or not the logic signal distorts such that the number of pulse waves counted by the counter circuit is incorrect, in response to determining that the logic signal does not distort such that the number of pulse waves counted by the counter circuit is incorrect, performing the process (o), and in response to determining that the logic signal distorts such that the number of pulse waves counted by the counter circuit is incorrect, controlling the gain amplifier circuit to multiply the voltage of the analog voltage signal by a gain for compensating the voltage of the analog voltage signal and then sequentially performing the processes (k) to (o);

(k) transmitting the analog voltage signal that is compensated from the gain amplifier circuit to the analog-digital converter by the processor circuit of the light receiver;

(l) converting, by the analog-digital converter, the analog voltage signal that is compensated into the digital voltage signal that is compensated;

(m) outputting, by the logic control circuit, the logic signal that is compensated to the counter circuit according to the digital voltage signal that is compensated;

(n) counting, by the counter circuit of the light receiver, a correct number of pulse waves according to the logic signal that is compensated;

(o) determining, by the signal processing circuit of the digital processor of the light receiver, whether or not energy of the photocurrent decreases during an operation of converting the photocurrent into the voltage such that the number of pulse waves counted by the counter circuit is incorrect, in response to determining that the energy of the photocurrent is not decreased, sequentially performing processes (p) to (s), and in response to determining that the energy of the photocurrent decreases, the signal processing circuit of the digital processor corrects the logic signal and outputs the logic signal that is corrected to the counter circuit for counting the correct number of pulse waves and then sequentially performing processes (p) to (s);

(p) outputting, by the signal processing circuit of the digital processor of the light receiver, logic levels of the logic signal to a finite state machine included in the digital processor of the light receiver;

(q) determining, by the finite state machine of the digital processor of the light receiver, whether the logic levels of the logic signal are correctly determined by the counter circuit;

(r) storing temporarily the logic levels that overflow by an overflow unit included in the light receiver when a number of the logic levels of the logic signal is more than a number of the logic levels allowed to be inputted to the finite state machine each time;

(s) determining, by the control circuit, according to the correct number of pulse waves, whether a difference exists between the light signal currently received by the light receiver and the first reflected light signal to determine whether the foreign object is on the detected object.

7. The foreign object detecting method according to claim 6, further comprising a process of:
arranging a first sub-light receiver and a second sub-light receiver along a diagonal direction of the light transmitter.

8. The foreign object detecting method according to claim 6, further comprising a process of:
arranging a first sub-light transmitter and a second sub-light transmitter along a diagonal direction of the light receiver.

9. The foreign object detecting method according to claim 6, further comprising processes of:
setting a preset detection time; and
receiving the light signal by the light receiver during the preset detection time.

10. The foreign object detecting method according to claim 6, further comprising a process of:
controlling a cleaning tool to clear away the foreign object when determining that the foreign object is on the detected object, by the control circuit.

* * * * *